US012094417B2

(12) United States Patent
Kim et al.

(10) Patent No.: US 12,094,417 B2
(45) Date of Patent: Sep. 17, 2024

(54) PIXEL CIRCUIT AND DISPLAY APPARATUS COMPRISING PIXEL CIRCUIT

(71) Applicant: LG Display Co., Ltd., Seoul (KR)

(72) Inventors: JeongHo Kim, Seoul (KR); DaeSung Jung, Paju-si (KR); DaeKyu Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/462,132

(22) Filed: Sep. 6, 2023

(65) Prior Publication Data

US 2024/0087525 A1 Mar. 14, 2024

(30) Foreign Application Priority Data

Sep. 13, 2022 (KR) ........................ 10-2022-0114844

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2320/0233* (2013.01); *G09G 2330/028* (2013.01)

(58) Field of Classification Search
CPC ............... G09G 3/32-3291; G09G 2320/0233
See application file for complete search history.

(56) References Cited

U.S. PATENT DOCUMENTS

| | | | | |
|---|---|---|---|---|
| 8,797,314 | B2 * | 8/2014 | Chung | G09G 3/325 345/212 |
| 9,646,535 | B2 * | 5/2017 | Yoon | G09G 3/3233 |
| 9,721,502 | B2 * | 8/2017 | Bi | G09G 3/3233 |
| 10,032,413 | B2 * | 7/2018 | Kim | G09G 3/3233 |
| 10,037,732 | B2 * | 7/2018 | Han | G09G 3/3266 |
| 10,083,659 | B2 * | 9/2018 | Xiang | G09G 3/32 |
| 10,235,937 | B2 * | 3/2019 | Li | G09G 3/3233 |
| 10,276,096 | B2 * | 4/2019 | Li | G09G 3/3266 |
| 10,424,243 | B2 * | 9/2019 | Kim | G09G 3/3233 |
| 10,535,303 | B2 * | 1/2020 | Xiang | G09G 3/3233 |
| 11,436,983 | B2 * | 9/2022 | Lim | G09G 3/3291 |
| 2022/0036825 | A1 * | 2/2022 | Teranishi | G09G 3/3233 |

(Continued)

FOREIGN PATENT DOCUMENTS

| | | |
|---|---|---|
| KR | 20210075431 A | 6/2021 |
| KR | 20210080781 A | 7/2021 |

*Primary Examiner* — Gene W Lee
(74) *Attorney, Agent, or Firm* — Seed IP Law Group LLP

(57) ABSTRACT

According to an aspect of the present disclosure, a pixel circuit includes a first capacitor connected between a first node and a second node, a first transistor connected to the first node and supplied with a first scan signal, a driving transistor including a gate electrode connected to the second node, a first electrode connected to a first voltage supply line, and a second electrode connected to a third node, a second transistor connected between the second node and the third node and supplied with a second scan signal, a third transistor connected between the third node and a fourth node, a fourth transistor which is connected to the fourth node and is supplied with a second scan signal of a previous pixel row and a light emitting diode connected to the fourth transistor and the third transistor at the fourth node.

17 Claims, 11 Drawing Sheets

(56) References Cited

U.S. PATENT DOCUMENTS

| | | | | |
|---|---|---|---|---|
| 2022/0172681 | A1* | 6/2022 | Kim | G09G 3/3266 |
| 2022/0376024 | A1* | 11/2022 | Zheng | G09G 3/3291 |
| 2022/0406248 | A1* | 12/2022 | Ju | G09G 3/3258 |

* cited by examiner

PIXEL CIRCUIT AND DISPLAY APPARATUS COMPRISING PIXEL CIRCUIT

CROSS-REFERENCE TO RELATED APPLICATIONS

This application claims the priority of Korean Patent Application No. 10-2022-0114844 filed on Sep. 13, 2022, in the Korean Intellectual Property Office, the disclosure of which is incorporated herein by reference.

BACKGROUND

Technical Field

The present disclosure relates to a pixel circuit and a display apparatus including a pixel circuit.

Description of the Related Art

An organic light emitting diode (OLED) which is a self-emitting device includes an anode electrode, a cathode electrode, and an organic compound layer formed therebetween. The organic compound layer is formed of a hole transport layer (HTL), an emission layer (EML), and an electron transport layer (ETL). When a driving voltage is input to the anode electrode and the cathode electrode, holes which pass through the hole transport layer (HTL) and electrons which pass through the electron transport layer (ETL) move to the emission layer (EML) to form excitons so that the emission layer (EML) generates visible rays. An active matrix type organic light emitting display apparatus includes an organic light emitting diode (OLED) which is a self-emitting device and is used in various ways with the advantages of a fast response speed, large emission efficiency, luminance, and viewing angle.

The organic light emitting display apparatus disposes pixels each including an organic light emitting diode in a matrix form and adjusts a luminance of the pixel in accordance with a gray scale level of video data.

Each pixel includes an organic light emitting diode, a driving transistor which controls a driving current flowing through the organic light emitting diode in accordance with a voltage between the gate and the source, and at least one switching transistor which programs the voltage between the gate and the source of the driving transistor.

BRIEF SUMMARY

The inventors have realized that in some pixel circuits, a line through which a high potential voltage is input and a line through which a reference voltage is input may be disconnected in an initialization period. In this case, a display defect such as horizontal stripes may be caused in the display apparatus. Therefore, a way to improve the display quality of the display apparatus is beneficial.

An object to be achieved by the exemplary embodiment of the present disclosure is to provide a display apparatus in which a current flow path in the initialization period is changed to minimize the defective display.

Objects of the present disclosure are not limited to the above-mentioned objects, and other objects, which are not mentioned above, can be clearly understood by those skilled in the art from the following descriptions.

According to an aspect of the present disclosure, a pixel circuit includes a first capacitor connected between a first node and a second node, a first transistor connected to the first node and supplied with a first scan signal, a driving transistor including a gate electrode connected to the second node, a first electrode connected to a first voltage supply line, and a second electrode connected to a third node, a second transistor connected between the second node and the third node and supplied with a second scan signal, a third transistor connected between the third node and a fourth node, a fourth transistor which is connected to the fourth node and is supplied with a second scan signal of a previous pixel row and a light emitting diode connected to the fourth transistor and the third transistor at the fourth node.

According to another aspect of the present disclosure, a display apparatus includes a pixel circuit which includes a plurality of pixel rows in which a plurality of sub pixels is disposed and operates in a precharging period, an initial period, a sampling period, and an emission period, a data driving circuit connected to the pixel circuit and a gate driving circuit which supplies a first scan signal, a second scan signal, and an emission signal to each of the plurality of pixel rows, wherein in the precharging period, an n-th first scan signal and an n-th second scan signal supplied from an n-th (n is a natural number) pixel row, among the plurality of pixel rows, are first levels and an n−1-th second scan signal and an n-th emission signal are second levels which are lower than the first level.

Other detailed matters of the exemplary embodiments are included in the detailed description and the drawings.

According to the present disclosure, in a pixel circuit and a display apparatus, a switching transistor is disposed between a gate node of a driving transistor and a reference voltage input node so that a current flow path of the initialization period is changed to reduce the driving failure of the pixel circuit and improve the display quality.

Further according to the present disclosure, the pixel circuit and the display apparatus disperse a load of the gate signal to improve an operation efficiency of the pixel circuit.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
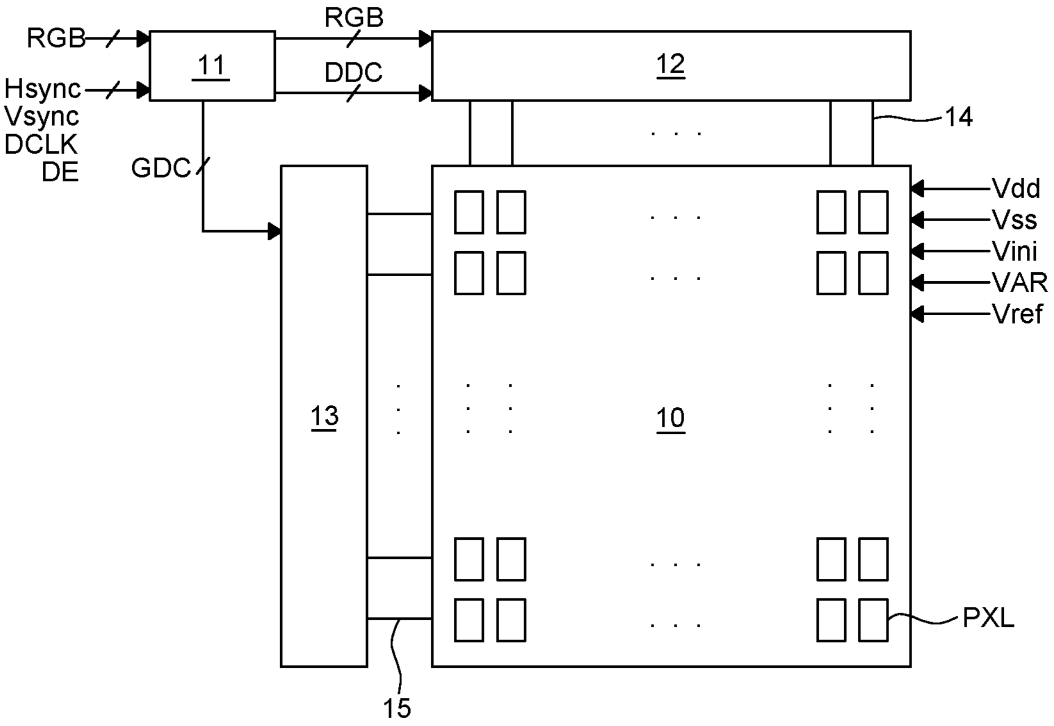
FIG. 1 is a block diagram of a display apparatus according to an exemplary embodiment of the present disclosure.

The terms used in the embodiments of this specification have been selected from general terms that are currently widely used as much as possible while considering the functions in the present disclosure, but they may vary depending on the intention or precedent of a person skilled in the art, the emergence of new technologies, and the like. there is. In a specific case, there is a term arbitrarily selected by the applicant, and in this case, the meaning will be described in detail in the corresponding description. Therefore, the term used in this specification should be defined based on the meaning of the term and the overall content of the present disclosure, not simply the name of the term.

When it is said that a certain part "includes" a certain component throughout the specification, it means that it may further include other components, not excluding other components unless otherwise state.

Expressions of "at least one of a, b, and c" described throughout the specification include 'a alone,' 'b alone,' 'c alone,' 'a and b,' and 'c,' and 'c,' or 'all a, b, and c.' Advantages and features of the present disclosure, and methods of achieving them, will become clear with reference to the embodiments described below in detail in conjunction with the accompanying drawings.

The shapes, sizes, ratios, angles, numbers, and the like illustrated in the accompanying drawings for describing the exemplary embodiments of the present disclosure are merely examples, and the present disclosure is not limited thereto. Further, in the following description of the present disclosure, a detailed explanation of known related technologies may be omitted to avoid unnecessarily obscuring the subject matter of the present disclosure.

The terms such as "including," "having," and "consist of" used herein are generally intended to allow other components to be added unless the terms are used with the term "only". Any references to singular may include plural unless expressly stated otherwise.

When the position relation between two parts is described using the terms such as "on," "above," "below," and "next," one or more parts may be positioned between the two parts unless the terms are used with the term "immediately" or "directly."

Although the terms "first," "second," and the like are used for describing various components, these components are not confined by these terms. These terms are merely used for distinguishing one component from the other components. Therefore, a first component to be mentioned below may be a second component in a technical concept of the present disclosure.

The features of various embodiments of the present disclosure can be partially or entirely adhered to or combined with each other and can be interlocked and operated in technically various ways, and the embodiments can be carried out independently of or in association with each other.

In addition, the terms that will be described later are defined in consideration of the functions in the implementation of this specification, which may change depending on the intention of the user, operator, or custom. Therefore, the definition should be made based on the contents throughout the specification.

A transistor which configures a pixel circuit of the present disclosure includes at least one of oxide thin film transistor (oxide TFT), amorphous silicon TFT (a-Si TFT), and a low temperature poly silicon (LTPS) TFT.

The following exemplary embodiments will be described with respect to an organic light emitting display. However, the exemplary embodiments of the present disclosure are not limited to the organic light emitting display, but may also be applied to an inorganic light emitting display including an inorganic light emitting material. For example, the exemplary embodiments of the present disclosure may be applied to a quantum dot display apparatus.

Hereinafter, according to exemplary embodiments of the present disclosure will be described in detail with reference to accompanying drawings.

FIG. 1 is a block diagram of a display apparatus according to an exemplary embodiment of the present disclosure.

As the display apparatus 1 according to the exemplary embodiment of the present disclosure, the electroluminescent display may be applied. The electroluminescent display apparatus may use an organic light emitting diode (OLED) display apparatus, a quantum dot light emitting diode display apparatus, or an inorganic light emitting diode display apparatus.

The display apparatus according to an exemplary embodiment may include a display panel 10 in which a sub pixel PXL for internal compensation is disposed, a data driver (or data driving circuit) 12 which drives data lines 14, a gate driver (or gate driving circuit) 13 which drives gate lines 15, a timing controller T-con 11. The timing controller 11 controls driving timings of the data driving circuit 12 and the gate driving circuit 13. For example, the gate driving circuit 13 may be a first driving circuit, but is not limited by the term. For example, the data driving circuit 12 may be a second driving circuit, but is not limited by the term.

In the display panel 10, a plurality of data lines 14 and a plurality of gate lines 15 intersect, and a plurality of sub pixels PXL for internal compensation is disposed in the intersection area of the data line 14 and/or the gate lines 15. The sub pixel PXL may be disposed in a matrix form as illustrated in the drawing, but is not limited thereto. Sub pixels PXL disposed in the same pixel row is connected to the plurality of gate lines 15, and the plurality of gate lines 15 may include at least one scan line and at least one emission control line.

For example, each sub pixel PXL may be connected to one data line 14 and at least one of the scan line and the emission control line. The sub pixels PXL may be commonly supplied with a high potential voltage Vdd and a low potential voltage Vss, and a reference voltage Vref from a power generating unit. In order to suppress unnecessary emission of the organic light emitting diode (OLED) during the initialization period and the sampling period, the reference voltage Vref may be within a voltage range sufficiently lower than the operation voltage of the OLED and may be set to be equal to or lower than the low potential voltage Vss. For example, the low potential voltage Vss may include a ground voltage (or 0 V). For example, the high potential voltage Vdd may be a first voltage, but is not limited by the term. For example, the low potential voltage Vss may be a second voltage, but is not limited by the term. The sub pixels PXL may be commonly further supplied with an initialization voltage Vini and a reset voltage VAR from the power generating unit.

Thin film transistors (TFTs) which configure the sub pixel PXL may be implemented by oxide transistors (or oxide TFTs) including an oxide semiconductor layer. The oxide TFT may be advantageous in increasing a size of the display panel 10 in consideration of the electron mobility and the process deviation. However, the exemplary embodiments of the present disclosure are not limited thereto and a semiconductor layer of the TFT may also be formed with amorphous silicon or polysilicon.

Each sub pixel PXL may include a plurality of TFTs and storage capacitors to compensate for a deviation of a threshold voltage Vth of the driving TFT. A specific configuration of each sub pixel PXL will be described in detail below.

In FIG. 1, a basic pixel may be configured by at least three sub pixels of white (W), red (R), green (G), and blue (B) sub pixels. For example, the basic pixel may be configured by sub pixels of a combination of red (R), green (G), and blue (B), sub pixels of a combination of white (W), red (R), and green (G), sub pixels of a combination of blue (B), white (W), and red (R), or sub pixels of a combination of green (G), blue (B), and white (W). Further, the basic pixel may be configured by sub pixels of a combination of white (W), red (R), green (G), and blue (B), but the exemplary embodiment of the present disclosure is not limited thereto.

The timing controller 11 rearranges digital video data RGB input from the outside in accordance with a resolution of the display panel 10 to supply the digital video data to the data driver 12. Further, the timing controller 11 may generate a data control signal DDC for controlling an operation timing of the data driving circuit 12 and a gate control signal GDC for controlling an operation timing of the gate driving circuit 13, based on timing signals such as a vertical synchronization signal Vsync, a horizontal synchronization signal Hsync, a dot clock signal DCLK, and a data enable signal DE.

The data driving circuit 12 converts digital video data RGB input from the timing controller 11 into an analog data voltage based on the data control signal DDC to supply the converted analog data voltage to a plurality of data lines 14.

The gate driving circuit 13 may generate scan signals Scan1 and Scan2 and an emission signal (or an emission control signal) EM based on the gate control signal GDC. The gate driving circuit 13 may include a scan driver and an emission signal driver. The scan driver generates a scan signal in a row sequential manner to drive at least one scan line connected to each pixel row to supply the generated scan signal to the scan lines. The emission signal driver generates an emission signal EM in a row sequential manner to drive at least one emission signal line connected to each pixel row to supply the generated emission signal to the emission signal lines.

According to an exemplary embodiment, the gate driver 13 is embedded in the non-active area of the display panel 10 by a gate-driver in panel (GIP) manner, but is not limited thereto. In some cases, a plurality of gate driving circuits 13 may be included and may be disposed on at least two side surfaces of the display panel 10, but the exemplary embodiment of the present disclosure is not limited thereto.

Figure 2:
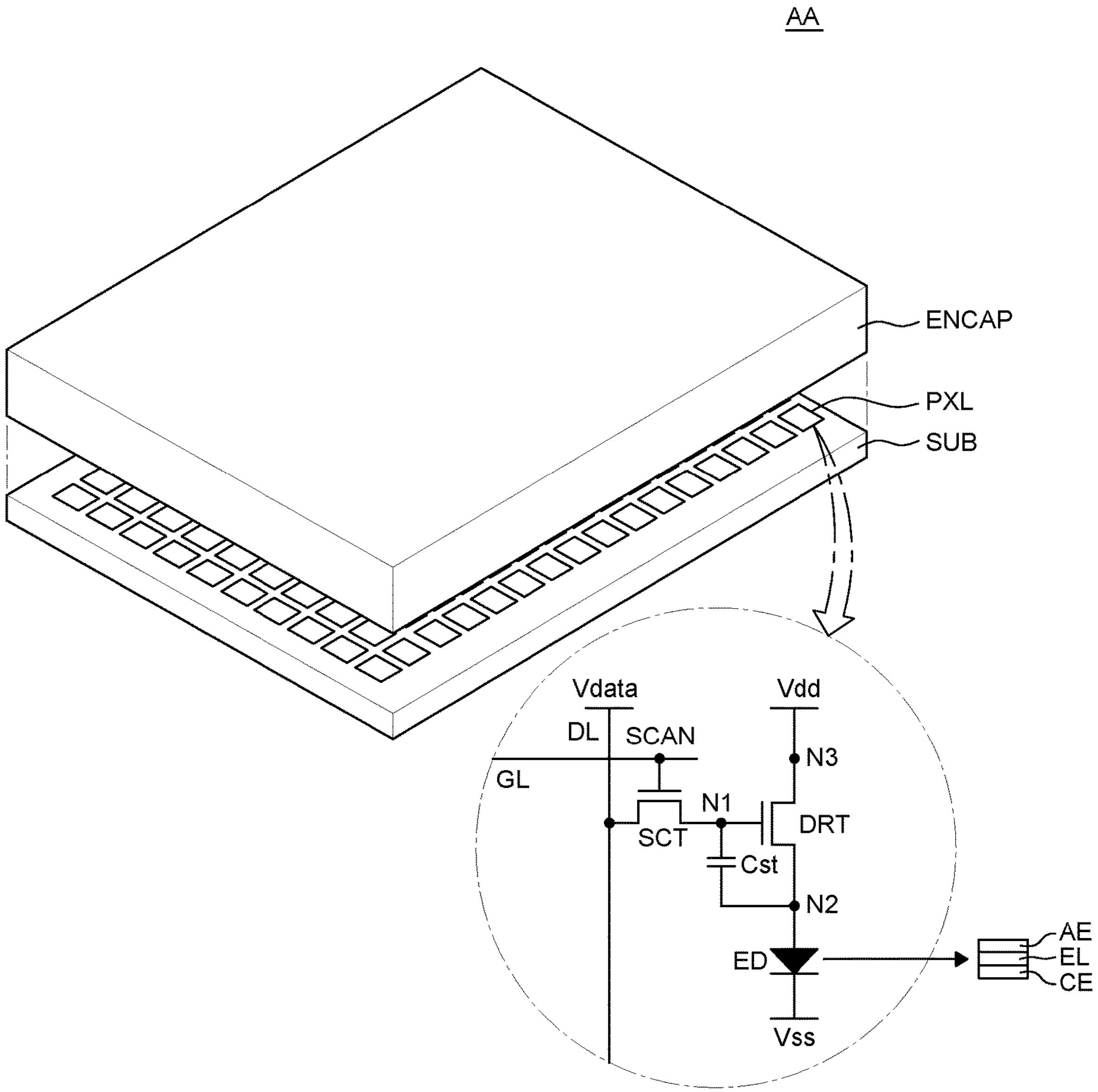
FIG. 2 is a view for explaining a pixel circuit of a display apparatus according to an exemplary embodiment of the present disclosure.

FIG. 2 is a view for explaining a pixel circuit of a display apparatus according to an exemplary embodiment of the present disclosure. FIG. 2 illustrates an example of a pixel circuit of a sub pixel PXL of FIG. 1.

Referring to FIG. 2, each sub pixel PXL disposed on a substrate SUB in an active area AA of a display panel 10 may include a light emitting diode OLED, a driving transistor DRT for driving the light emitting diode OLED, a scan transistor SCT for transmitting a data voltage Vdata to a first node n1 of the driving transistor DRT, and a storage capacitor Cst for maintaining a constant voltage for one frame.

The driving transistor DRT may include a first node n1 to which the data voltage Vdata is input, a second node n2 which is electrically connected to the light emitting diode OLED, and a third node n3 to which a high potential common voltage Vdd is input from a driving voltage line DVL. In the driving transistor DRT, the first node n1 is a gate node, the second node n2 may be a source node or a drain node, and the third node n3 may be a drain node or a source node.

The light emitting diode OLED may include an anode electrode AE, an emission layer EL, and a cathode electrode CE. The anode electrode AE may be a pixel electrode disposed in each sub pixel PXL and may be electrically connected to the second node n2 of the driving transistor DRT of each sub pixel PXL. The cathode electrode CE may be a common electrode which is commonly disposed in a plurality of sub pixels PXL and may be applied with a low potential common voltage Vss.

For example, the anode electrode AE may be a pixel electrode and the cathode electrode CE may be a common electrode. In contrast, the anode electrode AE may be a common electrode and the cathode electrode CE may be a pixel electrode. Hereinafter, for the convenience of description, it is assumed that the anode electrode AE is a pixel electrode and the cathode electrode CE is a common electrode.

For example, the light emitting diode OLED may be an organic light emitting diode, an inorganic light emitting diode, or a quantum dot light emitting diode. When the light emitting diode OLED is an organic light emitting diode, in the light emitting diode OLED, the emission layer EL may include an organic emission layer including an organic material.

The scan transistor SCT is controlled to be turned on/off by a scan signal SCAN which is a gate signal input through the gate line GL. The scan transistor SCT may be configured to switch the electrical connection between the first node n1 of the driving transistor DRT and the data line DL.

The storage capacitor Cst may be electrically connected between the first node n1 and the second node n2 of the driving transistor DRT.

As illustrated in FIG. 2, each sub pixel PXL may have a 2T (transistor) 1C (capacitor) structure including two transistors DRT and SCT and one capacitor Cst. According to an exemplary embodiment, at least one sub pixel may further include one or more transistors or one or more capacitors.

The storage capacitor Cst may be an external capacitor which is intentionally designed at the outside of the driving transistor DRT, rather than a parasitic capacitor which is an internal capacitor that may exist between the first node n1 and the second node n2 of the driving transistor DRT.

Each of the driving transistor DRT and the scan transistor SCT may be an n-type transistor or a p-type transistor.

Circuit elements (specifically, a light emitting diode OLED) in each sub pixel PXL are vulnerable to external moisture or oxygen. Therefore, an encapsulation layer ENCAP for suppressing the permeation of external moisture or oxygen into the circuit elements (specifically, the light emitting diode ED) may be disposed on the display panel (for example, the display panel 10 of FIG. 1). The encapsulation layer ENCAP may be disposed so as to cover the light emitting diodes OLED. For example, the encapsulation layer ENCAP may be disposed so as to fully cover the light emitting diodes OLED.

Figure 3:
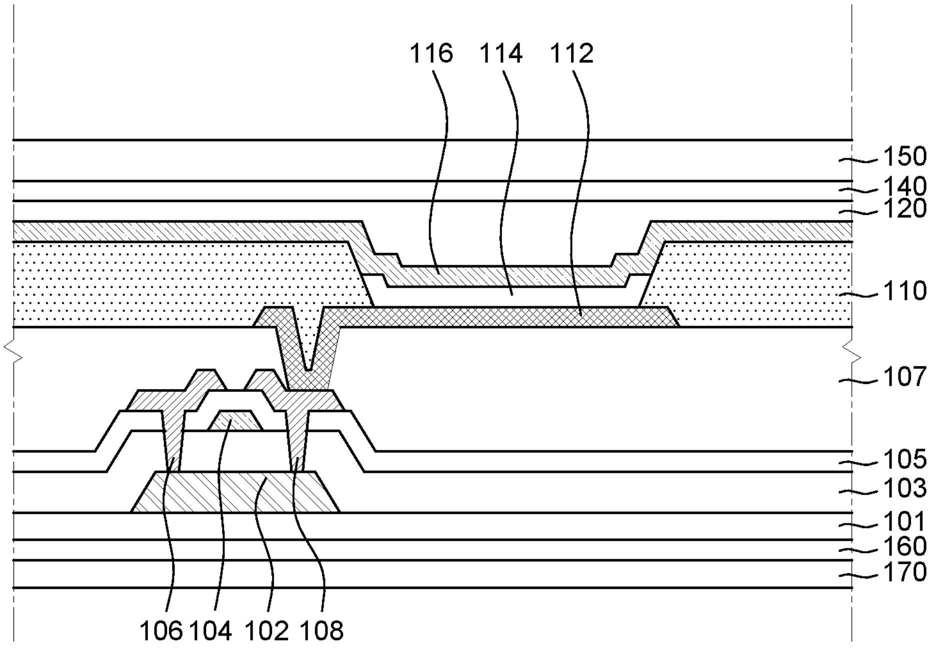
FIG. 3 is a view illustrating a cross-section of at least a part of a display apparatus according to an exemplary embodiment of the present disclosure.

FIG. 3 is a view illustrating a cross-section of at least a part of a display apparatus according to an exemplary embodiment of the present disclosure.

Referring to FIG. 3, thin film transistors 102, 104, 106, and 108 and organic light emitting diodes 112, 114, and 116 are located on the substrate 101.

In the exemplary embodiment, the substrate 101 may be a glass or plastic substrate. When the substrate is a plastic substrate, polyimide based or polycarbonate based materials are used so that the substrate may have a flexibility.

In the exemplary embodiment, the thin film transistor may be formed by sequentially disposing a semiconductor layer 102, a gate insulating film 103, a gate electrode 104, an interlayer insulating film 105, source and drain electrodes 106 and 108, but the exemplary embodiments of the present disclosure are not limited thereto.

In the exemplary embodiment, the semiconductor layer 102 may be made of poly silicon (p-Si). In this case, a predetermined region may be doped with impurities. The semiconductor layer 102 may also be made of amorphous silicon (a-Si) or various organic semiconductor materials such as pentacene. As another example, the semiconductor layer 102 may also be made of oxide. When the semiconductor layer 102 is formed of polysilicon, amorphous silicon is formed and is crystalized to be changed to polysilicon. As a crystallization method, various methods, such as rapid thermal annealing (RTA), metal induced lateral crystallization (MILC), or sequential lateral solidification (SLS) may be applied, but the exemplary embodiments of the present disclosure are not limited thereto.

In the exemplary embodiment, the gate insulating film 103 may be formed of an insulating material, such as a silicon oxide (SiOx) film or a silicon nitride (SiNx) film, or may also be formed of an insulating organic material. The gate electrode 104 may be formed of various conductive materials, for example, magnesium (Mg), aluminum (Al), nickel (Ni), chrome (Cr), molybdenum (Mo), tungsten (W), gold (Au), or an alloy thereof, but the exemplary embodiments of the present disclosure are not limited thereto.

In the exemplary embodiment, the interlayer insulating film 105 may be formed of an insulating material, such as a silicon oxide (SiOx) film or a silicon nitride (SiNx) film, or may also be formed of an insulating organic material. The interlayer insulating film 105 and the gate insulating film 103 are selectively removed to form a contact hole through which the source and drain regions are exposed.

In the exemplary embodiment, the source and drain electrodes 106 and 108 are formed on the interlayer insulating layer 105 as a single layer or a plurality of layers with a material for the gate electrode 104 so as to bury the contact hole.

In the exemplary embodiment, the passivation film 107 may be located on the thin film transistor. The passivation film 107 protects and planarizes the thin film transistor. The passivation film 107 may be configured to have various shapes. The passivation film may be modified in various ways, for example, the passivation film may be formed of an organic insulating film such as benzocyclobutene (BCB) or acryl, or an inorganic insulating layer such as a silicon nitride film (SiNx) or a silicon oxide layer (SiOx), or may also be formed of a single layer or double layers or a plurality of layers. However, the exemplary embodiments of the present disclosure are not limited thereto.

In the exemplary embodiment, the organic light emitting diode is formed by sequentially disposing a first electrode 112, an organic emission layer 114, and a second electrode 116. For example, the organic light emitting diode is configured by the first electrode 112 formed on the passivation film 107, the organic emission layer 114 located on the first electrode 112, and the second electrode 116 located on the organic emission layer 114.

In the exemplary embodiment, the first electrode 112 is electrically connected to the drain electrode 108 of the driving transistor through the contact hole. The first electrode 112 may be formed of an opaque conductive material having a high reflectance. For example, the first electrode 112 may be formed by silver (Ag), aluminum (Al), aluminum nitride (AlN), gold (Au), molybdenum (Mo), tungsten (W), chrome (Cr), or an alloy of at least a part thereof, but the exemplary embodiments of the present disclosure are not limited thereto.

In the exemplary embodiment, a bank 110 is formed in a remaining area excluding an emission area. Therefore, the bank 110 has a bank hole which exposes the first electrode 112 corresponding to the emission area. The bank 110 may be formed of an inorganic insulating material, such as a silicon nitride film (SiNx) or a silicon oxide film (SiOx) or an organic insulating material, such as BCB, acrylic resin or imide resin, but the exemplary embodiments of the present disclosure are not limited thereto.

In the exemplary embodiment, the organic light emitting layer 114 is located on the first electrode 112 which is exposed by the bank 110. The organic emission layer 114 may include an emission layer, an electron injection layer, an electron transport layer, a hole transport layer, and/or a hole injection layer, but the exemplary embodiments of the present disclosure are not limited thereto.

In the exemplary embodiment, the second electrode 116 is located on the organic emission layer 114. The second electrode 116 is formed of a transparent conductive material such as indium tin oxide (ITO) or indium zinc oxide (IZO) to emit light generated in the organic emission layer 114 above the second electrode 116.

In the exemplary embodiment, an upper encapsulation layer 120 is located on the second electrode 116. At this time, the upper encapsulation layer 120 may be configured by an inorganic film formed of glass, metal, aluminum oxide (AlOx), or silicon (Si) based material or have a structure in which organic films and inorganic films are alternately laminated, but the exemplary embodiments of the present disclosure are not limited thereto. The upper encapsulation layer 120 suppresses the permeation of the oxygen and moisture from the outside to suppress the oxidation of an emission material and an electrode material. When the organic light emitting diode is exposed to the moisture or oxygen, pixel shrinkage phenomenon in which the light emitting area is reduced is caused or a dark spot may be generated in the light emitting area.

In an exemplary embodiment, a barrier film 150 is located on the upper encapsulation layer 120 to encapsulate the entire substrate 101 including the organic light emitting diode. The barrier film 150 may be a retardation film or an optically isotropic film. When the barrier film has an optical isotropy, light incident onto the barrier film may be transmitted as it is without delaying a phase. An organic film or an inorganic film may be further located on an upper surface or lower surface of the barrier film. The inorganic layer may include a silicon oxide film (SiOx) or a silicon nitride film (SINx). The organic layer may include a polymer material such as acrylic resin, epoxy resin, polyimide, or polyethylene, but the exemplary embodiments of the present disclosure are not limited thereto. The organic film or the inorganic film which is formed on an upper surface or a lower surface of the barrier film serves to suppress permeation of the moisture or oxygen.

In the exemplary embodiment, an adhesive layer 140 may be located between the barrier film 150 and the upper encapsulation layer 120. The adhesive layer 140 bonds the upper encapsulation layer 120 and the barrier film 150 to each other. The adhesive layer 140 may be a thermosetting or natural curable adhesive, but the exemplary embodiments of the present disclosure are not limited thereto. For example, the adhesive layer 140 may be configured by a material such as a barrier pressure sensitive adhesive (B-PSA), but the exemplary embodiments of the present disclosure are not limited thereto.

In the exemplary embodiment, a lower adhesive layer 160 and a lower encapsulation layer 170 may be sequentially formed below the substrate 101. The lower encapsulation layer 170 may be formed of one or more organic materials of polyethylene naphthalate (PEN), polyethylene terephthalate (PET), polyethylene ether phthalate, polycarbonate, polyarylate, polyether imide, polyether sulfonate, polyimide, or polyacrylate. However, the exemplary embodiments of the present disclosure are not limited thereto. The lower encapsulation layer 170 serves to suppress the permeation of the moisture or oxygen into the substrate from the outside.

In the exemplary embodiment, the lower adhesive layer 160 is formed by a thermosetting or natural curable adhesive, and serves to bond the substrate 101 and the lower encapsulation layer 170. For example, the lower adhesive layer 160 may be formed of a material such as optically cleared adhesive (OCA).

Figure 4:
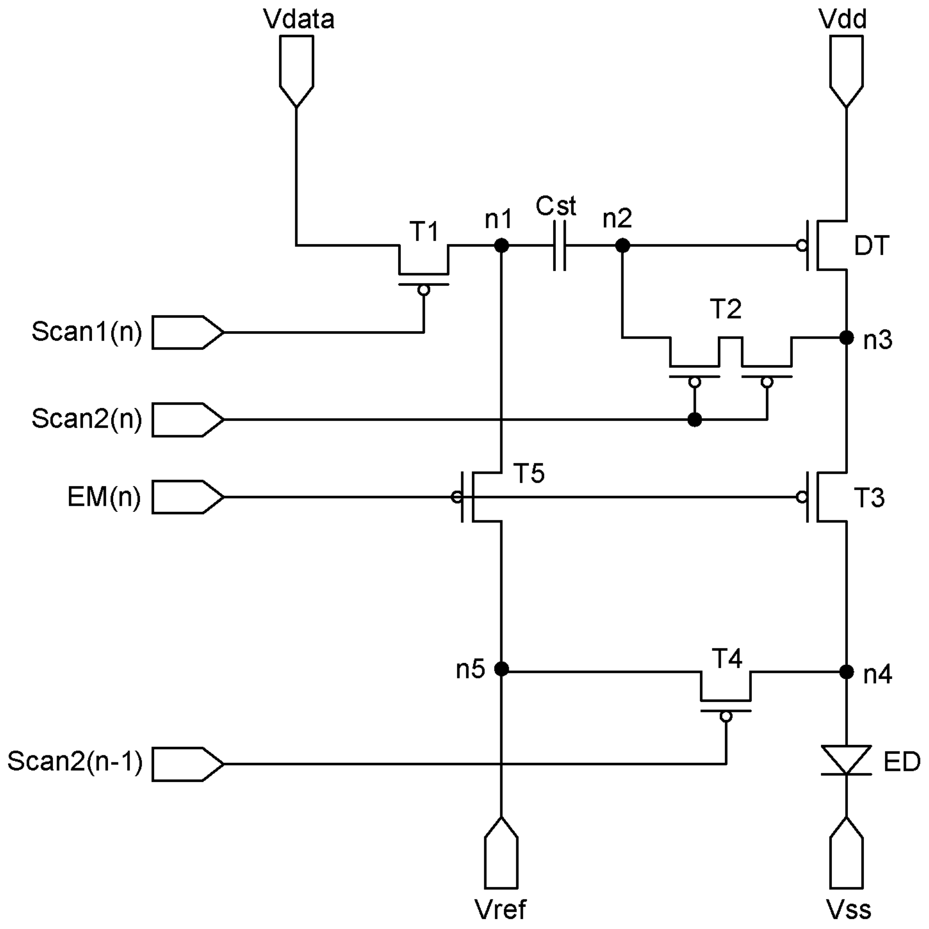
FIG. 4 is a view illustrating an example of a pixel circuit of a display apparatus according to an exemplary embodiment of the present disclosure.

FIG. 4 is a view illustrating an example of a pixel circuit of a display apparatus according to an exemplary embodiment of the present disclosure. FIG. 4 illustrates an example of an equivalent circuit of a sub pixel included in a display apparatus according to an exemplary embodiment of the present disclosure.

The display apparatus according to the exemplary embodiment of the present disclosure may include a pixel circuit including a plurality of sub pixels, for example, a plurality of pixel rows in which each of the plurality of sub pixels PXL of FIG. 1 is disposed. The pixel circuit may operate in a precharging period, an initial period, a sampling period, and an emission period. For example, each of the plurality of sub pixels included in the pixel circuit may operate in the precharging period, the initial period, the sampling period, and the emission period. Hereinafter, one sub pixel, among the plurality of sub pixels, will be described in more detail and for the convenience of description, the sub pixel circuit is referred to as a "pixel circuit" but the present exemplary embodiment is not limited to this example.

Referring to FIG. 4, the pixel circuit may include six thin film transistors (TFTs or transistors), one capacitor Cst, and a light emitting diode ED. For example, the pixel circuit may include a driving TFT DT, a first TFT T1, a second TFT T2, a third TFT T3, a fourth TFT T4, a fifth TFT T5, a capacitor Cst, and a light emitting diode ED. The pixel circuit having six TFTs and one capacitor may be referred to as a 6T1C pixel circuit, but is not limited by the term.

In the exemplary embodiment, the pixel circuit may include a plurality of capacitors. For example, the pixel circuit may include a capacitor Cst and an additional capacitor. The capacitor Cst may include a storage capacitor. Namely, a first electrode of Cst is coupled to n1 and a second electrode is coupled to n2. The additional capacitor, if one is present, may also operate as an additional storage capacitor, but is not limited thereto and or it may operate as a component for more stable pixel driving.

In the exemplary embodiment, the pixel circuit is supplied with a high potential voltage Vdd, a low potential voltage Vss, a reference voltage Vref, and a data voltage Vdata. The high potential voltage Vdd, the low potential voltage Vss, and the reference voltage Vref are DC voltages (or direct current voltages) and the data voltage Vdata may be an AC voltage (or an alternating current voltage).

In the exemplary embodiment, the pixel circuit may be connected to a high potential voltage supply line (or a first voltage supply line) which supplies a high potential voltage Vdd, a low potential voltage supply line (or a second voltage supply line) which supplies a low potential voltage Vss, a reference voltage supply line which supplies a reference voltage Vref, and a data voltage supply line (or a data line) which supplies a data voltage Vdata. The high potential voltage Vdd is referred to as a first voltage and the low potential voltage Vss may be referred to as a second voltage which is lower than the first voltage, but the exemplary embodiment of the present disclosure is not limited thereto.

In the exemplary embodiment, the high potential voltage Vdd may have a voltage value higher than the low potential voltage Vss and the reference voltage Vref. The low potential voltage Vss may be equal to or lower than the reference voltage Vref. The data voltage Vdata may have a voltage value in a specific range. For example, the data voltage Vdata may have a value between 0 to 10 V, but the exemplary embodiment of the present disclosure is not limited thereto.

In the exemplary embodiment, a first scan signal Scan1 and a second scan signal Scan2 may be supplied (or input) to the pixel circuit. The display panel is configured by n+1 pixel rows (or rows) and k pixel columns (or columns) and may include a pixel circuit disposed so as to correspond to a point position of the matrix (for example, an intersecting point of a first pixel row and a first pixel column). The matrix arrangement may be a matrix arrangement and a specific example of the arrangement may refer to FIG. 1.

According to an exemplary embodiment, a number of rows disposed in at least some pixel column may be different from the number of rows disposed in the other part of pixel column. For example, when the display panel is implemented in various forms, the pixel circuits may be disposed according to the form.

In the exemplary embodiment, a first scan signal Scan1 and a second scan signal Scan2 may be supplied to each pixel row of the display panel. For example, a first first scan signal and a first second scan signal may be supplied to the first pixel row. In this manner, an n-th first scan signal and an n-th second scan signal may be supplied to an n-th pixel row. Therefore, in each pixel row, there may be a first scan signal supply line and a second scan signal supply line which match (or map or correspond). For example, a first scan line which supplies the n-th first scan signal Scan1(n) and a second scan line which supplies the n-th second scan line Scan2(n) may match the n-th pixel row.

In the exemplary embodiment, at least one of scan signals corresponding to surrounding pixel rows may be supplied to each pixel row of the display panel. For example, a second scan signal Scan2(n−1) of an n−1-th pixel row may be supplied to the n-th pixel row. A scan line which supplies a second scan signal Scan2(n−1) of an n−1-th pixel row to the n-th pixel row may correspond to a third scan line. The third scan line may be branched from a line which supplies a second scan signal of an n−1-th pixel row. However, it is not limited thereto and may also be designed as a separate line.

Hereinafter, for the convenience of description, a configuration and signal flow of a pixel circuit will be described with respect to one sub pixel disposed in an n-th pixel row. A pixel circuit and an operation thereof which will be described in the present disclosure may correspond to at least a part of a pixel circuit included in the display apparatus.

According to an exemplary embodiment, the n−1-th pixel row may be referred to as a previous pixel row. For example, a second scan signal Scan2(n−1) of an n−1-th pixel row may be referred to as a second scan signal of a previous pixel row, but is not limited by this term.

In the exemplary embodiment, the pixel circuit may be connected to a line which supplies an emission signal EM(n) of an n-th pixel row. The line to which the emission signal EM(n) of the n-th pixel row is supplied may be an emission signal line.

In the exemplary embodiment, the driving TFT DT is a transistor for driving the light emitting diode OLED, which may be referred to as a driving transistor. A first electrode of the driving TFT DT may be connected to the high potential voltage supply line (or a first voltage supply line). A second electrode of the driving TFT DT may be connected to the third node n3. The gate electrode of the driving TFT DT is connected to the second node n2. The driving TFT DT is turned on or turned off by the voltage of the second node n2 and may supply a high potential voltage Vdd which is supplied by the high potential voltage supply line to the third node n3 when it is turned on.

The first electrode or the second electrode of the driving TFT DT may correspond to a source electrode or a drain electrode. For example, the first electrode corresponds to the source electrode and the second electrode may correspond to the drain electrode. As another example, the second electrode corresponds to the source electrode and the first electrode may correspond to the drain electrode.

In the exemplary embodiment, the capacitor Cst may be connected between the first node n1 and the second node n2. For example, the first electrode of the capacitor Cst is connected to the driving TFT DT and may be connected to the second node n2. The second electrode of the capacitor Cst is connected to the first TFT T1 and may be connected to the first node n1. As another example, the first electrode of the capacitor Cst may be connected to the gate electrode of the driving TFT DT. The second electrode of the capacitor Cst may be connected to the first TFT T1.

In the exemplary embodiment, the capacitor Cst may include a storage capacitor. The storage capacitor may be a component which charges an electric energy (for example, charges or a data voltage) to maintain a constant voltage for one frame. For example, when the input of the data voltage through the first TFT T1 stops during the process of driving a pixel circuit, the capacitor Cst supplies a stored electric energy to the driving TFT DT to maintain the driving of the driving TFT DT during one frame.

In the exemplary embodiment, the capacitor Cst may be configured by a parasitic capacitor which is an internal capacitor. However, it is not limited thereto and the capacitor Cst may also be an external capacitor disposed at the outside of the driving TFT DT.

In the exemplary embodiment, the first electrode of the first TFT T1 may be connected to a data voltage supply line (or a data line) which supplies the data voltage Vdata. The second electrode of the first TFT T1 may be connected to at least one of the capacitor Cst and the fifth TFT T5. For example, the second electrode of the first TFT T1 is connected to the capacitor Cst and may be connected to the first electrode of the fifth TFT T5. As another example, the first TFT T1 may be connected to the first node n1. In this case, the first TFT T1 may be connected to the other configuration connected to the first node n1, for example, the capacitor Cst. According to the exemplary embodiment, the first TFT T1 may be referred to as a first transistor, but is not limited by the term.

As another exemplary embodiment, the second electrode of the first TFT T1 may be connected to a data voltage supply line which supplies the data voltage Vdata. The first electrode of the first TFT T1 may be connected to at least one of the capacitor Cst and the fifth TFT T5.

In the exemplary embodiment, the first electrode and the second electrode of the first TFT T1 may correspond to a source electrode or a drain electrode. For example, the first electrode corresponds to the source electrode and the second electrode may correspond to the drain electrode. Alternatively, the first electrode corresponds to the drain electrode and the second electrode may correspond to the source electrode. Similarly, the first electrode or the second electrode of the TFT to be described below (for example, the second TFT T2, the third TFT T3, the fourth TFT T4, and/or the fifth TFT T5) may correspond to the source electrode or the drain electrode.

In the exemplary embodiment, the gate electrode of the first TFT T1 may be connected to the first scan line which supplies a first scan signal Scan1(n) of the n-th pixel row. The first scan signal Scan1(n) of the n-th pixel row may be supplied to a gate electrode of the first TFT T1 through the first scan line. Accordingly, the first scan signal Scan1(n) of the n-th pixel row may be supplied to the first TFT T1. The first scan signal Scan1(n) of the n-th pixel row which is supplied through the first scan line may be referred to as a "first scan signal" or an "n-th first scan signal," but is not limited by the term.

In the exemplary embodiment, the first TFT T1 may be turned on or turned off according to the first scan signal Scan1(n). When the first TFT T1 is turned on, the first node n1 and the data voltage supply line may be electrically connected. In this case, the data voltage Vdata may be supplied to the first node n1 through the data voltage supply line.

In the exemplary embodiment, the second TFT T2 may be connected to the second node n2 and/or the third node n3. In the exemplary embodiment, the first electrode of the second TFT T2 may be connected to the second node n2. The first electrode of the second TFT T2 may be connected to at least one of the gate electrode of the driving TFT DT and the capacitor Cst. For example, the first electrode of the second TFT T2 may be connected to the gate electrode of the driving TFT DT and the capacitor Cst. The second electrode of the second TFT T2 may be connected to the third node n3. The second electrode of the second TFT T2 may be connected to at least one of the third TFT T3 and the driving TFT DT. For example, the second electrode of the second TFT T2 may be connected to the first electrode of the third TFT T3 and the second electrode of the driving TFT DT.

In the exemplary embodiment, the gate electrode of the second TFT T2 may be connected to the second scan line which supplies a second scan signal Scan2(n) of the n-th pixel row. The second scan signal Scan2(n) of the n-th pixel row which is supplied through the second scan line may be referred to as a "second scan signal" or an "n-th second scan signal," but is not limited by the term.

In the exemplary embodiment, the second TFT T2 may be connected between the second node n2 and the third node n3. The second scan signal Scan2(n) of the n-th pixel row may be supplied to the second TFT T2. The second TFT T2 may be turned on or turned off according to the second scan signal Scan2(n) of the n-th pixel row. When the second TFT T2 is turned on, the second TFT T2 may connect between the second node n2 and the third node n3. The second TFT T2 may be referred to as a second transistor, but is not limited by this term.

In the exemplary embodiment, the second TFT T2 may include a plurality of sub transistors. In this case, the second TFT T2 may be referred to as a multi-transistor, a double transistor, or a dual transistor. In another exemplary embodiment, the second TFT T2 may include a plurality of gate electrodes. In this case, the second TFT T2 may be referred to as a multi-gate transistor, a double gate transistor, or a dual gate transistor.

When the second TFT T2 includes a plurality of sub transistors or a plurality of gate electrodes, current leaked from the second TFT T2, for example, a leakage current between the second node n2 and the reference voltage supply line may be effectively reduced.

In the exemplary embodiment, the third TFT T3 may be connected between the third node n3 and the fourth node n4. The first electrode of the third TFT T3 is connected to the third node n3 and the second electrode may be connected to the fourth node n4. The first electrode of the third TFT T3 may be connected to at least one of the second TFT T2 and the driving TFT DT. For example, the first electrode of the third TFT T3 may be connected to the second electrode of the second TFT T2 and the second electrode of the driving TFT DT. The second electrode of the third TFT T3 may be connected to at least one of the fourth TFT T4 and the light emitting diode ED. For example, the second electrode of the third TFT T3 may be connected to the second electrode of the fourth TFT T4 and the light emitting diode ED.

In the exemplary embodiment, the gate electrode of the third transistor T3 may be connected to the emission signal line which supplies the emission signal EM(n) of the n-th pixel row. The emission signal of the n-th pixel row may be supplied to the gate electrode of the third TFT T3. The third TFT T3 may receive the emission signal. The third TFT T3 may be turned on or turned off according to the n-th emission signal EM(n) supplied through the emission signal line. When the third TFT T3 is turned on, the third TFT T3 may connect between the third node n3 and the fourth node n4. The third TFT T3 may be referred to as a third transistor, but is not limited by this term.

In the exemplary embodiment, the fourth transistor T4 may be connected to the fifth node n5. The first electrode of the fourth TFT T4 may be connected to the fifth node n5. The first electrode of the fourth TFT T4 may be connected to at least one of the fifth TFT T5 and the reference voltage supply line. For example, the first electrode of the fourth TFT T4 may be connected to the second electrode of the fifth TFT T5 and the reference voltage supply line. Here, the reference voltage supply line may include a line which supplies the reference voltage Vref.

In the exemplary embodiment, the fourth TFT T4 may be connected to the fourth node n4. The second electrode of the fourth TFT T4 may be connected to the fourth node n4. The second electrode of the fourth TFT T4 may be connected to at least one of the third TFT T3 and the light emitting diode ED. For example, the second electrode of the fourth TFT T4 may be connected to the second electrode of the third TFT T3 and the light emitting diode ED.

In the exemplary embodiment, the gate electrode of the fourth TFT T4 may be connected to the third scan line which supplies a second scan signal Scan2(n−1) of the n−1-th pixel row (or a previous pixel row). The fourth TFT T4 may be turned on or turned off according to the second scan signal Scan2(n−1) of the n−1-th pixel row supplied through the third scan line. The second scan signal Scan2(n−1) of the n−1-th pixel row may be referred to as an n−1-th second scan signal, but is not limited thereto. The fourth TFT T4 may be referred to as a fourth transistor, but is not limited by this term.

In the exemplary embodiment, when the fourth TFT T4 is turned on, the fourth TFT T4 may connect between the fourth node n4 and the fifth node n5. For example, when the fourth TFT T4 is turned on, the fourth TFT T4 connects between the fourth node n4 and the fifth node n5 to charge the fourth node n4 with the reference voltage Vref. A period in which the fourth node n4 is charged with the reference voltage Vref may correspond to a precharging period of the pixel circuit. A more specific example related thereto will be described with reference to FIG. 6.

After charging the fourth node n4, the second scan signal Scan2(n) of the n-th pixel row may be supplied. In this case, the second TFT T2 is turned on to perform an initial operation of the pixel circuit. A period in which the second TFT T2 is turned on to perform the initial operation of the pixel circuit may correspond to the initial period. A more specific example related thereto will be described with reference to FIG. 7.

As described above, when the fourth node n4 is charged with the reference voltage Vref, even though the second TFT T2 is turned on, an effect of rising a voltage of an electrode, for example, an anode electrode, connected to the fourth node n4 of the light emitting diode ED may be reduced. As the rising of the voltage of the anode electrode is reduced, the initial peak phenomenon in which the voltage excessively rises during the initial period may be reduced. As the initial peak is reduced, the imbalanced luminance at the edge or the center of the display panel, for example, black spot, is improved and the luminance uniformity may be improved.

In the exemplary embodiment, the fifth transistor T5 may be connected to the first node n1. The first electrode of the fifth TFT T5 may be connected to the first node n1. The first electrode of the first TFT T1 may be connected to at least one of the capacitor Cst and the first TFT T1. For example, the first electrode of the fifth TFT T5 is connected to the capacitor Cst and may be connected to the second electrode of the first TFT T1. The second electrode of the fifth TFT T5 may be connected to the fifth node n5. The second electrode of the fifth TFT T5 may be connected to the fourth TFT T4 and at least one of the reference voltage supply lines. For example, the second electrode of the fifth TFT T5 may be connected to the fourth TFT T4 and the reference voltage supply line.

In the exemplary embodiment, the gate electrode of the fifth TFT T5 may be connected to the emission signal line which supplies the emission signal EM(n) of the n-th pixel row. The fifth TFT T5 may receive the emission signal. The fifth TFT T5 may be turned on or turned off according to the emission signal EM(n) of the n-th pixel row input through the emission signal line. When the fifth TFT T5 is turned on, the fifth TFT T5 may connect between the first node n1 and the fifth node n5. When the fifth TFT T5 is turned on, the first node n1 may be charged with the reference voltage Vref.

In the exemplary embodiment, the light emitting diode ED may be connected between the fourth node n4 and the low potential voltage supply line. For example, the anode electrode of the light emitting diode ED is connected to the fourth node n4, and the cathode electrode of the light emitting diode ED may be connected to the low potential voltage supply line (or the second voltage supply line). Here, the low potential voltage supply line may be a line which supplies the low potential voltage Vss. The low potential voltage Vss may be lower than the high potential voltage Vdd described above. For example, the voltage which is supplied through the low potential voltage line may include a ground voltage. The low potential voltage Vss and the high potential voltage Vdd may be set in advance.

In the exemplary embodiment, the light emitting diode ED may be connected to the fourth TFT T4 and the third TFT T3 at the fourth node n4.

According to the exemplary embodiment, the high potential voltage Vdd is referred to as a first voltage and the low potential voltage Vss may be referred to as a second voltage. The high potential voltage supply line is referred to as the first voltage supply line and the low potential voltage supply line may be referred to as the second voltage supply line. In this case, the voltage which is supplied by the first voltage supply line may be higher than a voltage which is supplied by the second voltage supply line.

In the exemplary embodiment, the first electrode of the light emitting diode ED, for example, the anode electrode, may be connected to the third TFT T3 and the fourth TFT T4. The other side of the light emitting diode ED may be connected to the low potential voltage supply line.

In the exemplary embodiment, the light emitting diode ED may include at least one of an organic light emitting diode, an inorganic light emitting diode, and a quantum dot light emitting diode. When the light emitting diode ED is an organic light emitting diode, the emission layer of the light emitting diode ED may include an organic emission layer including an organic material.

In the exemplary embodiment of the present disclosure, TFTs included in the pixel circuit may be a p-type transistor. For example, the driving TFT, the first TFT T1, the second TFT T2, the third TFT T3, the fourth TFT T4, the fifth TFT T5, and the sixth TFT T6 which are included in the pixel circuit may be p-type transistors, respectively. However, it is not limited thereto and according to the exemplary embodiment, at least one TFT may be implemented by an n-type transistor.

In the case of the p-type TFT, a low level voltage of each driving signal may be a gate-on voltage which turns on the TFT and a high level voltage of each driving signal may be a gate-off voltage which turns off the TFTs. In the case of the n-type TFT, a low level voltage of each driving signal may be a gate-off voltage which turns off the TFT and a high level voltage of each driving signal may be a gate-on voltage which turns on the TFTs.

Here, the low level voltage may correspond to a predetermined voltage (or a previously set voltage) which is lower than a high level. The high level voltage may correspond to a predetermined voltage (or a previously set voltage) which is higher than the low level voltage.

According to the exemplary embodiment of the present disclosure, the low level voltage may be a first voltage and the high level voltage may be a second voltage, but the exemplary embodiment of the present disclosure is not limited thereto. In this case, the first voltage may be lower than the second voltage.

In the exemplary embodiment, the pixel circuit of the display apparatus may operate in a precharging period, the initial period (or an initialization period), the sampling period, and the emission period. The above-mentioned periods will be described in more detail with reference to FIGS. 5 to 9.

According to the exemplary embodiment, the pixel circuit may operate in a holding period. The holding period may be a period in which the driving of the pixel circuit stops for a specific time to be maintained.

Figure 5:
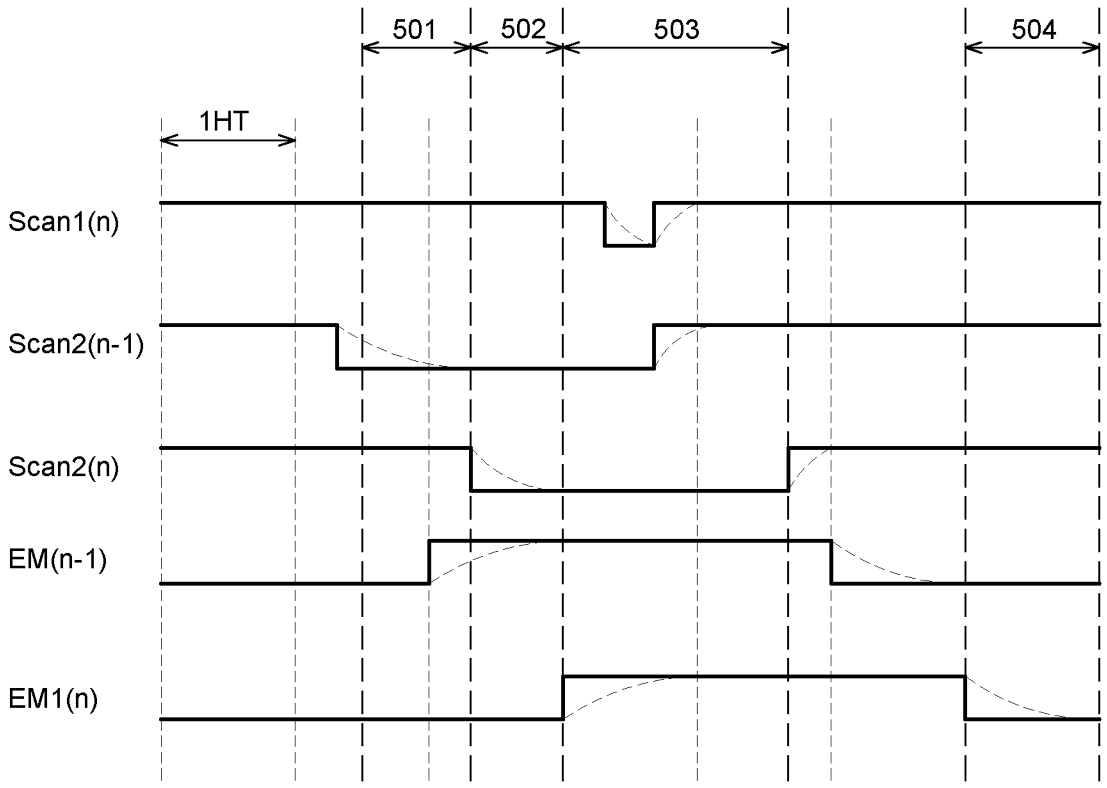
FIG. 5 is a view for explaining a timing of a signal related to a pixel circuit of a display apparatus according to an exemplary embodiment of the present disclosure.

FIG. 5 is a view for explaining a timing of a signal related to a pixel circuit of a display apparatus according to an exemplary embodiment of the present disclosure. FIG. 5 is a view for explaining a signal input (or supplied) to the pixel circuit of FIG. 4 and a driving period of a pixel circuit according to a state of the input signal.

Referring to FIG. 5, a horizontal time (HT) may be a time period in which one pixel row is on and off one time. If the display panel includes five pixel rows, a time when the display panel is on and off one time may correspond to a time period in which all five pixel rows are on and off one time, for example, 5 HT. According to the exemplary embodiment, a time when the display panel is on and off one time may be one frame, but the exemplary embodiment of the present disclosure is not limited thereto. FIG. 5 illustrates a driving timing of the pixel circuit disposed in the n-th pixel row and the following description is a description of the pixel circuit disposed in the n-th pixel row.

In the exemplary embodiment, the driving period of the pixel circuit may include a precharging period 501, an initial period 502, a sampling period 503, and an emission period 504. The precharging period 501, the initial period 502, the sampling period 503, and the emission period 504 may be sequential driving periods, respectively. For example, the initial period 502 may appear after the precharging period 501 has passed. The sampling period 503 may appear after the initial period 502 has passed. The emission period 504 may appear after the sampling period 503 has passed. According to the exemplary embodiment, a holding period may exist between the sampling period 502 and the emission period 504, but the exemplary embodiment of the present disclosure is not limited to this example.

In the exemplary embodiment, the precharging period 501 may include a period in which a specific node of the pixel circuit is charged with the reference voltage Vref. For example, the first node n1 and the fourth node n4 of the pixel circuit may be charged with the reference voltage Vref during the precharging period 501.

In the exemplary embodiment, signals input to the pixel circuit may have a high level (or a high level voltage) or a low level (or a low level voltage). Each of the high level and the low level may have a predetermined signal value (or a specific voltage value).

In the exemplary embodiment, the low level may be a voltage value which is lower than the high level. The low level may be a voltage belonging to a range of a value which turns on the p-type TFT or turns off the n-type TFT. For example, the low level may include a voltage corresponding to the range of −8 V to −12 V, but the exemplary embodiments of the present disclosure are not limited thereto. The high level may belong to a range of a voltage value which may turn off the p-type TFT or turn on the n-type TFT. For example, the high level may include a voltage corresponding to the range of 6V to 16V, but the exemplary embodiments of the present disclosure are not limited thereto.

In the exemplary embodiment, a pulse width of the first scan signal may be smaller than a pulse width of the second scan signal. In another exemplary embodiment, the pulse width of the first scan signal may be equal to or broader than the pulse width of the second scan signal.

In the exemplary embodiment, during the precharging period 501, the first scan signal Scan1(n) of the n-th pixel row and the second scan signal Scan2(n) of the n-th pixel row are input as high levels. Further, the second scan signal Scan2(n−1) of the n−1-th pixel row, the emission signal EM(n−1) of the n−1-th pixel row, and the emission signal EM(n) of the n-th pixel row may be input as low levels.

In the exemplary embodiment, the emission signal EM(n−1) of the n−1-th pixel row is input as a low level and then may be changed to the high level during the precharging period 502. For example, the emission signal EM(n−1) of the n−1-th pixel row is input as a low level at a start time of the precharging period 502 and then may be changed to the high level at a predetermined time in the middle of the precharging period. A time when the emission signal EM(n−1) of the n−1-th pixel row is changed from the low level to the high level may corresponding to an end time of the horizontal time HT. For example, the emission signal EM(n−1) of the n−1-th pixel row may be changed to the high level in accordance with a time when one horizontal period ends during the precharging period 501.

In the exemplary embodiment, the initial period 502 may be performed before supplying the data voltage Vdata. During the initial period 502, the first scan signal Scan1(n) of the n-th pixel row and the emission signal EM(n−1) of the n−1-th pixel row may be input as high level voltages. The second scan signal Scan2(n−1) of the n−1-th pixel row, the second scan signal Scan2(n) of the n-th pixel row, and the emission signal EM(n) of the n-th pixel row may be input as low level voltages.

In the exemplary embodiment, the initial period 502 may start at a falling time of the second scan signal Scan2(n) of the n-th pixel row. For example, the initial period 502 may start based a fact that the second scan signal Scan2(n) of the n-th pixel row is changed from the high level to the low level. The falling time may be a time when the signal is changed from the high level voltage to the low level voltage.

In the exemplary embodiment, at a time when the initial period 502 ends or a time when the horizontal time HT of the n−1-th pixel row ends may correspond to a rising time of the emission signal EM(n) of the n-th pixel row. Here, the rising time may correspond to a time when the signal is changed from the low level to the high level.

In the exemplary embodiment, the sampling period 503 may be performed while supplying the data voltage Vdata to the pixel circuit. For example, the data voltage Vdata may be supplied to different pixel columns at every horizontal time HT. In this case, the sampling period 503 of FIG. 5 may perform in accordance with the horizontal period HT in which the data voltage Vdata is supplied to a column in which the pixel circuit is disposed.

In the exemplary embodiment, during the sampling period 503, the first scan signal Scan1(n) of the n-th pixel row may be input as a high level and/or a low level. For example, at a start time of the sampling period 503, the first scan signal Scan1(n) of the n-th pixel row may be input as a high level. The first scan signal Scan1(n) of the n-th pixel row may be changed to the low level after a predetermined time in the sampling period 503. In the sampling period 503, the first scan signal Scan1(n) of the n-th pixel row is input at the low level during a predetermined time period and then may be changed to the high level again.

During the sampling period 503, the second scan signal Scan2(n) of the n-th pixel row may be input as a low level. The second scan signal Scan2(n−1) of the n−1-th pixel row may be input as a low level. The second scan signal Scan2(n−1) of the n−1-th pixel row is input as a low level and then may be input as a high level after a specific time. When the second scan signal Scan2(n−1) of the n−1-th pixel row is changed to a high level, it may be maintained until the sampling period 503 ends. The emission signal EM(n−1) of the n−1-th pixel row and the emission signal EM(n) of the n-th pixel row may be input as high levels.

In the exemplary embodiment, the sampling period 503 may start in response to the rising time of the emission signal EM(n) of the n-th pixel row. For example, the sampling period 503 may start based a fact that the emission signal EM(n) of the n-th pixel row is changed from the low level to the high level. The sampling period 503 may end in response to the rising time of the second scan signal Scan2(n) of the n-th pixel row. For example, the sampling period 503 may end based a fact that the second scan signal Scan2(n) of the n-th pixel row is changed from the low level to the high level.

In the exemplary embodiment, the emission period 504 may be performed after the sampling period 503. In the emission period 504, the first scan signal Scan1(n) of the n-th pixel row, the second scan signal Scan2(n−1) of the n−1-th pixel row, and the second scan signal Scan2(n) of the n-th pixel row may be input as high levels. The emission signal EM(n) of the n-th pixel row and the emission signal EM(n−1) of the n−1-th pixel row may be input as low levels.

In the exemplary embodiment, a holding period may exist between the sampling period 503 and the emission period 504. The holding period may start in response to the rising time of the second scan signal Scan2(n) of the n-th pixel row. For example, the holding period may start from a time when the second scan signal Scan2(n) of the n-th pixel row is changed from the low level to the high level. The holding period may end in response to the falling time of the emission signal EM(n) of the n-th pixel row. For example, the holding period may end at a time when the emission signal EM(n) of the n-th pixel row is changed from the high level to the low level.

According to the exemplary embodiment, during the holding period, there may be no change in the operation of the pixel circuit. For example, during the holding period, such as a state in which the voltage is not input to the pixel circuit to be paused, a state of the end time of the sampling period 503 or a start time of the holding period may be constantly maintained.

In the exemplary embodiment, a solid line pulse of FIG. 5 illustrates an example that a signal is input, and a dotted line pulse illustrates an example that a signal is delayed during a process of inputting the signal to the pixel circuit. For example, the gate driving circuit supplies the signals, such as the first scan signal Scan1(n), second scan signals S2(n−1) and S2(n), and the emission signal EM(n−1) and EM(n) to the pixel circuit as illustrated in FIG. 5 with the solid line pulse, but during the process of supplying the signals, the delay may occur. Therefore, the signals may be input to the pixel circuit as illustrated with the dotted line pulse. It may be considered as an error range related to the driving of the pixel circuit and the related matter may be considered to be included in the scope of the exemplary embodiment of the present disclosure. For example, when the delay occurs while the signal is changed from the low level voltage to the high level voltage so that the signal appears as illustrated with the dotted line, it may be included in the scope of the exemplary embodiment.

The precharging period 501, the initial period 502, the sampling period 503, and the emission period 504 will be described in more detail with reference to FIGS. 6 to 9 below. Hereinafter, in the drawing, the repeated content with the above-described content will be omitted.

Figure 6:
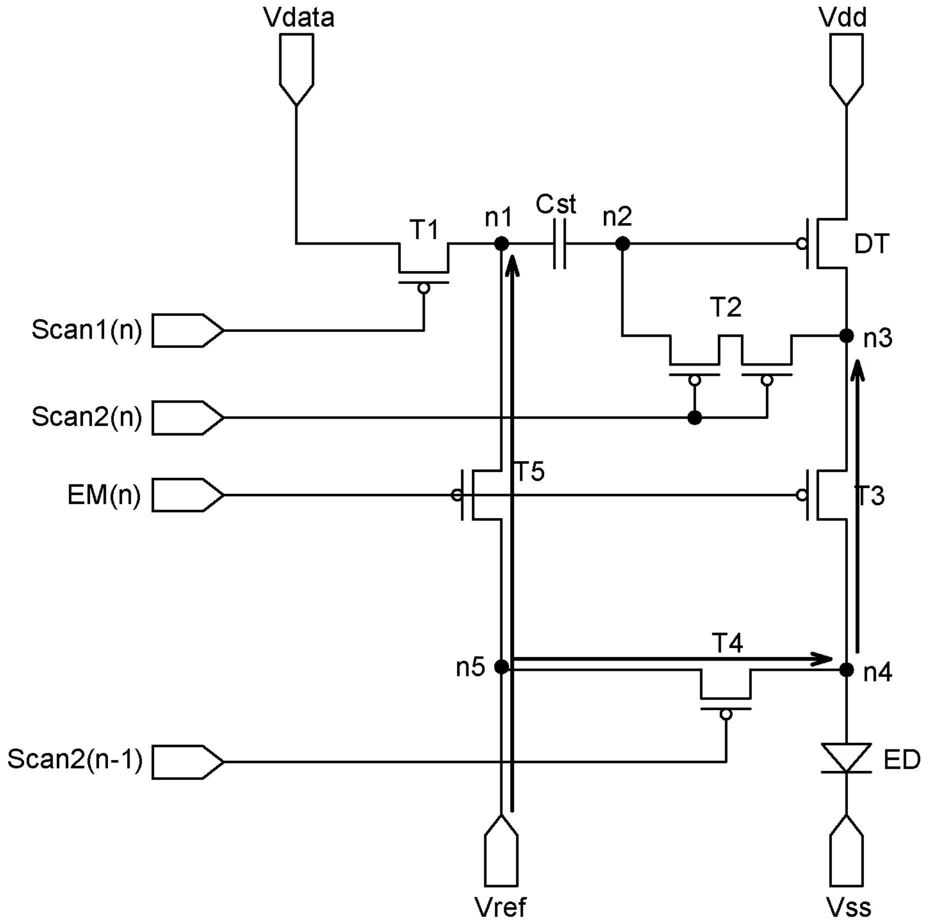
FIG. 6 is a view for explaining the driving of a pixel circuit of a display apparatus according to an exemplary embodiment of the present disclosure in a precharging period.

FIG. 6 is a view for explaining the driving of a pixel circuit of a display apparatus according to an exemplary embodiment of the present disclosure in a precharging period. For example, FIG. 6 illustrates an operation of the pixel circuit in the precharging period 501 of FIG. 5.

Referring to FIG. 6, the fourth TFT T4 may be turned on during the precharging period. The fourth node n4 may be charged (or precharged) with the reference voltage Vref based on the fourth transistor T4 which is turned on. The anode electrode of the light emitting diode ED may be connected to the fourth node n4 and in this case, the anode electrode of the light emitting diode ED may be charged with the reference voltage Vref.

According to the exemplary embodiment, during the precharging period, the third TFT T3 and/or the fifth TFT T5 may be turned on. As the third TFT T3 is turned on, the third node n3 may be charged with the reference voltage Vref. As the fifth TFT T5 is turned on, the first node n1 may be charged with the reference voltage Vref.

In the exemplary embodiment, the gate electrode of the third TFT T3 and the gate electrode of the fifth TFT T5 may receive the emission signal EM(n) of the n-th pixel row. In this case, during the precharging period, the third TFT T3 and the fifth TFT T5 may be turned on. For example, the third TFT T3 may be turned on together as the fifth TFT T5 is turned on.

In the exemplary embodiment, the third TFT T3, the fourth TFT T4, and the fifth TFT T5 may include p-type transistors. The fourth TFT T4 may be turned on as the second scan signal Scan2(n−1) of the n−1-th pixel row is input as a low level. The fifth TFT T5 may be turned on as the emission signal EM(n) of the n-th pixel row is input as a low level. The third TFT T3 may be turned on as the emission signal EM(n) of the n-th pixel row is input as a low level.

In another exemplary embodiment, the fourth TFT T4 receives the second scan signal Scan2(n−1) of the n−1-th pixel row, and the gate electrode of the third TFT T3 and the gate electrode of the fifth TFT T5 may receive a signal different from the emission signal EM(n) of the n-th pixel row. For example, the fourth TFT T4 receives the second scan signal Scan2(n−1) of the n−1-th pixel row of a low level, and the third TFT T3 and the fifth TFT T5 may receive a different signal of a high level. In this case, the fourth TFT T4 is turned on and the third TFT T3 and the fifth TFT T5 may be turned off. As the fourth TFT T4 is turned on, the fourth node n4 may be charged with the reference voltage Vref. By doing this, the precharging period may operate.

Figure 7:
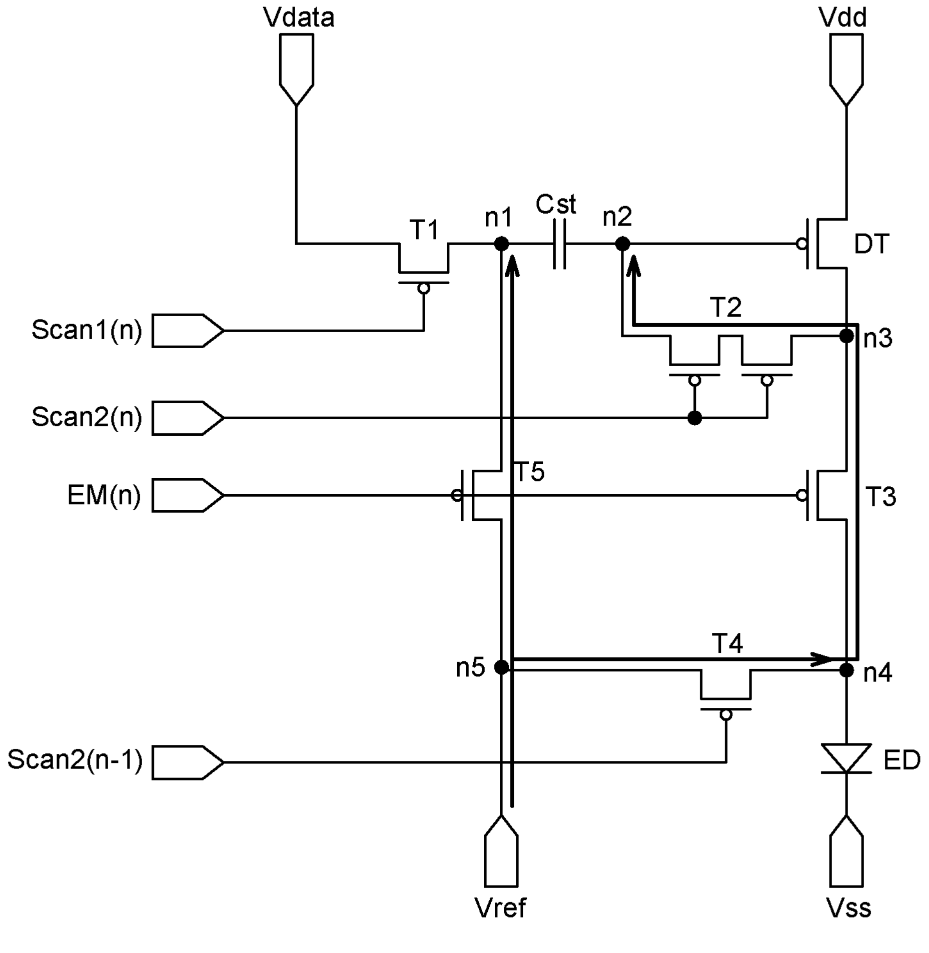
FIG. 7 is a view for explaining the driving of a pixel circuit of a display apparatus according to an exemplary embodiment of the present disclosure in an initial period.

FIG. 7 is a view for explaining the driving of a pixel circuit of a display apparatus according to an exemplary embodiment of the present disclosure in an initial period. For example, FIG. 7 illustrates an operation of the pixel circuit in the initial period 502 of FIG. 5.

Referring to FIG. 7, during the initial period, the second TFT T2, the third TFT T3, the fourth TFT T4, and the fifth TFT T5 may be turned on. As the second TFT T2 and the fifth TFT T5 are turned on, the reference voltage Vref may be input to the first node n1, the second node n2, the third node n3, and the fourth node n4. In this case, the second node n2 and the third node n3 may be initialized with the reference voltage Vref. The charging of the reference voltage Vref may be maintained at the fourth node n4. For example, the reference voltage Vref is consistently input to the fourth node n4 so that the charging state may be maintained.

In the exemplary embodiment, during the initial period, the second TFT T2 is turned on so that the reference voltage Vref may be input to the gate electrode of the driving TFT DT. The reference voltage Vref may operate as an initialization voltage which initializes the driving TFT DT. The high potential voltage (or the first voltage) Vdd may be input to the first electrode (or the source electrode) of the driving TFT DT. In this case, a gate-source voltage of the driving TFT DT may correspond to "reference voltage Vref-high potential voltage Vdd.

In the exemplary embodiment, the low potential voltage supply line which supplies the low potential voltage Vss may be connected to the light emitting diode ED, for example, the cathode electrode of the light emitting diode ED. The low potential voltage supply line is disposed at an upper end of the light emitting diode ED to be connected to at least a part of the cathode electrode. According to the exemplary embodiment, the low potential voltage supply line may be disposed to be parallel to the data voltage supply line, the reference voltage supply line and/or the high potential voltage supply line or on the same plane, but is not limited thereto.

In the exemplary embodiment, at least some of the data voltage supply line, the reference voltage supply line, and the high potential voltage supply line may be disposed to be parallel. For example, the data voltage supply line, the reference voltage supply line, and the high potential voltage supply line may be disposed on the plane to be parallel to each other.

In the exemplary embodiment, when the pixel circuit of the n-th pixel row operates in the initial period, the pixel circuit of the n−1-th pixel row may perform an operation in a step which precedes the pixel circuit of the n-th pixel row by 1 HT. For example, when the pixel circuit of the n-th pixel row operates in the initial period, the pixel circuit of the n−1-th pixel row may perform an operation of the sampling period. The operation of the sampling period will be described below with reference to FIG. 8.

Figure 8:
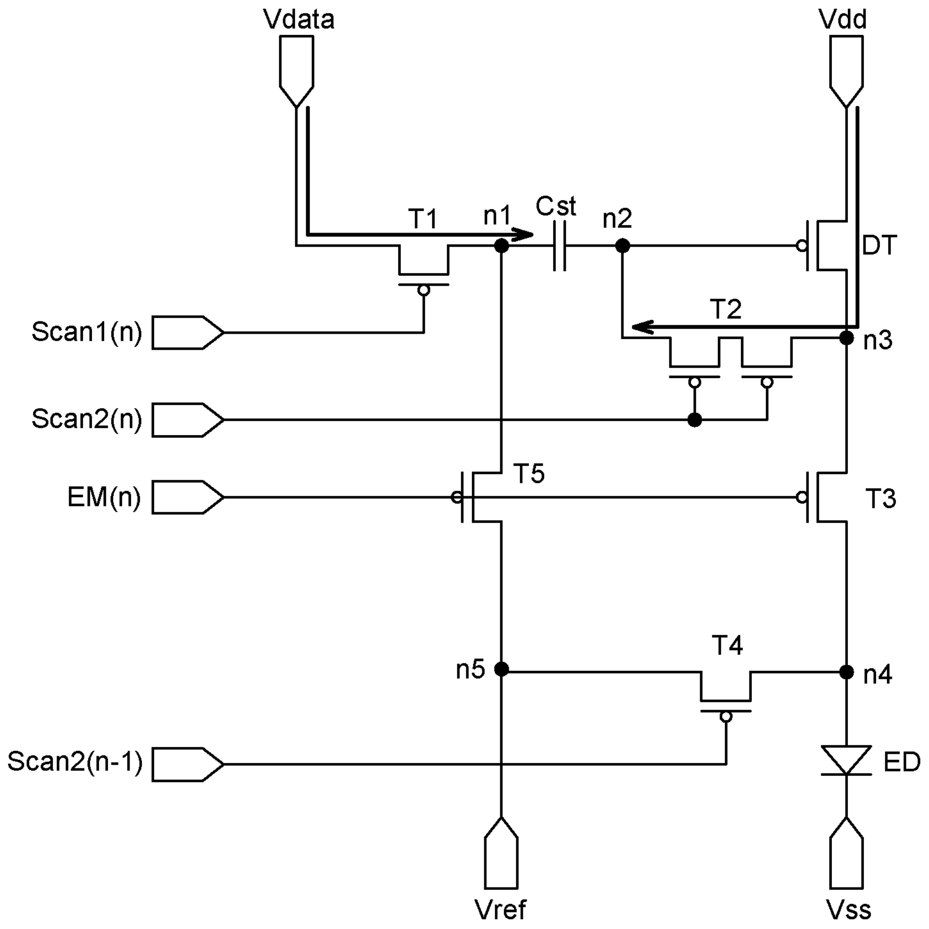
FIG. 8 is a view for explaining the driving of a pixel circuit of a display apparatus according to an exemplary embodiment of the present disclosure in a sampling period.

FIG. 8 is a view for explaining the driving of a pixel circuit of a display apparatus according to an exemplary embodiment of the present disclosure in a sampling period. For example, FIG. 8 illustrates an operation of the pixel circuit in the sampling period 503 of FIG. 5.

Referring to FIG. 8, in the sampling period, the first TFT T1 and the second TFT T2 may be turned on. In the sampling period, the third TFT T3, the fourth TFT T4, and the fifth TFT T5 may be turned off. As the first TFT T1 is turned on, the data voltage Vdata may be input to the first node n1. The data voltage Vdata may be charged in the capacitor Cst.

In the exemplary embodiment, in the sampling period, the first scan signal Scan1(n) of the n-th pixel row and the second scan signal Scan2(n) of the n-th pixel row may be input as low levels. The emission signal EM(n) of the n-th pixel row and the second scan signal Scan2(n−1) of the n−1-th pixel row may be input as high levels.

In the exemplary embodiment, the sampling period may start as the emission signal EM(n) of the n-th pixel row is input as a high level. For example, as the emission signal EM(n) of the n-th pixel row is input as a high level, the input of the reference voltage Vref with respect to the first node n1 and the third node n3 may be stopped. At this time, as the first scan signal Scan1(n) of the n-th pixel row and the second scan signal Scan2(n) of the n-th pixel row are input as low levels, the data voltage Vdata is input to the first node n1 and the high potential voltage Vdd may be input to the third node n3. Accordingly, the sampling operation may be performed.

In the exemplary embodiment, during the sampling period, a voltage of a "Vdd+Vth" level corresponding to a sum of the high potential voltage Vdd and the threshold voltage Vth of the driving TFT DT may be charged in the second node n2 by the second TFT T2.

In the exemplary embodiment, during the sampling period, a voltage corresponding to "the sum of the high potential voltage Vdd and the threshold voltage Vth," that is, a voltage Vdd+Vth obtained by completely compensating for the threshold voltage Vth may be input to the gate electrode of the driving TFT DT. The high potential voltage Vdd may be input to the source electrode of the driving TFT DT. In this case, a gate-source voltage of the driving TFT DT may correspond to the threshold voltage Vth. In the pixel circuit, a current may flow until the gate-source voltage of the driving TFT DT corresponds to the threshold voltage Vth.

During the sampling period, when the data voltage Vdata is input to the first node n1 and the threshold voltage Vth of the driving TFT is completely compensated at the second node n2, the data voltage Vdd+Vth-Vdata obtained by completely compensating for the threshold voltage Vth may be input to the gate electrode of the driving TFT DT.

In the exemplary embodiment, when the sampling period ends, the holding period may start. The holding period may be a period in which a state of the pixel circuit, for example, a voltage at every node set after the sampling operation is maintained. As another example, the holding period may be a period in which the gate-source voltage Vgs of the driving TFT DT set by the sampling period is maintained.

In the exemplary embodiment, in response to the high level of the first scan signal, the second scan signal, and the emission signal which are input to the pixel circuit, the sampling period ends and the holding period may start. During the holding period, the pixel circuit may maintain a predetermined state. For example, all the first TFT T1 to fifth TFT T5 may maintain the off-state. The holding period may be maintained from a time when the sampling period ends to a time when the emission period starts.

Figure 9:
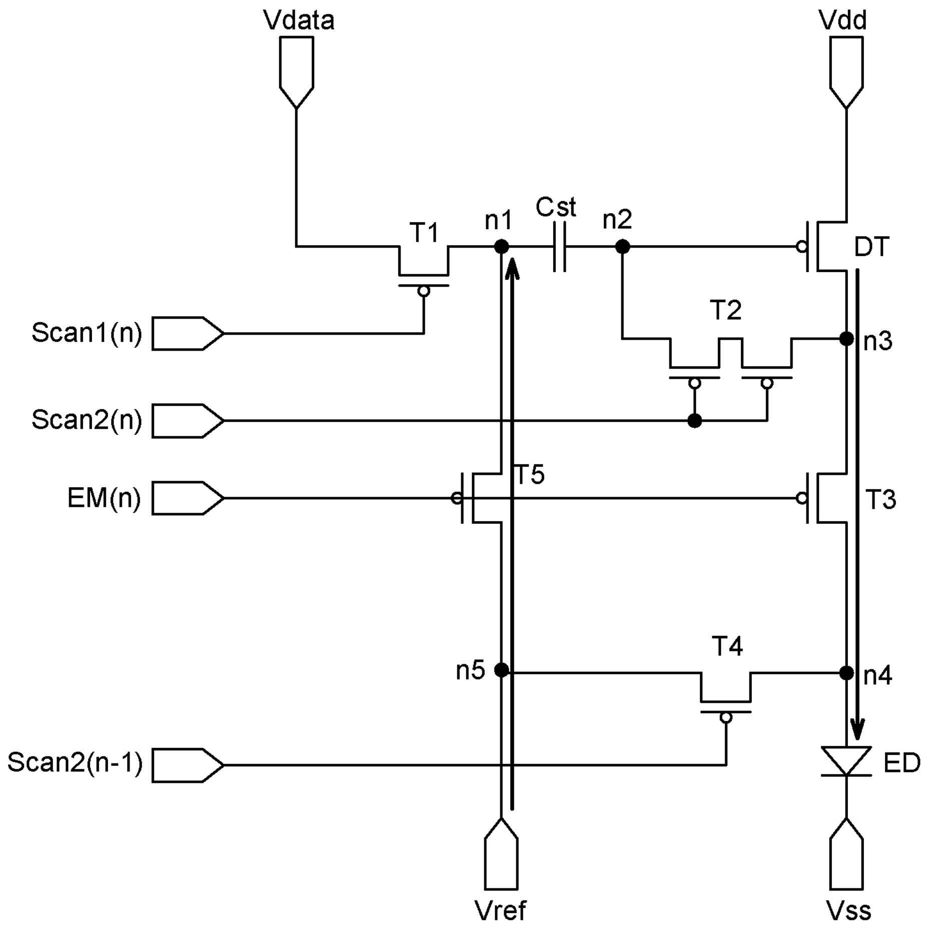
FIG. 9 is a view for explaining the driving of a pixel circuit of a display apparatus according to an exemplary embodiment of the present disclosure in an emission period.

FIG. 9 is a view for explaining signal flow of a display apparatus according to an exemplary embodiment of the present disclosure in an emission period. For example, FIG. 9 illustrates an operation of the pixel circuit in the emission period 504 of FIG. 5.

Referring to FIG. 9, in the emission period, the third TFT T3 and the fifth TFT T5 may be turned on. In the emission period, the first TFT T1, the second TFT T2, and the fourth TFT T4 may be turned off. In the emission period, the driving TFT DT may be turned on.

In the exemplary embodiment, as the third TFT T3 is turned on, the voltage stored in the capacitor Cst may be supplied to the light emitting diode ED. The light emitting diode ED may emit light as the voltage stored in the capacitor Cst is input.

In the exemplary embodiment, during the emission period, when the reference voltage Vref is input to the first node n1 through the fifth TFT T5, the voltage of the first node n1 may vary to "Vdata−Vref" and the varied voltage Vdata-Vref may be input to the second node n2 by the coupling of the capacitor Cst. Therefore, during the emission period, "Vdd+Vth+(Vref-Vdata)" may be input to the gate electrode of the driving TFT DT. The high potential voltage Vdd may be input to the source electrode (or the first electrode) of the driving TFT DT. In this case, a gate-source voltage Vgs of the driving TFT DT may be determined as "Vth+(Vref−Vdata)". Accordingly, the driving TFT DT generates a current which is proportional to "Vref-Vdata" without being affected by the threshold voltage Vth to supply the current to the light emitting diode ED through the third TFT T3.

Figure 10A:
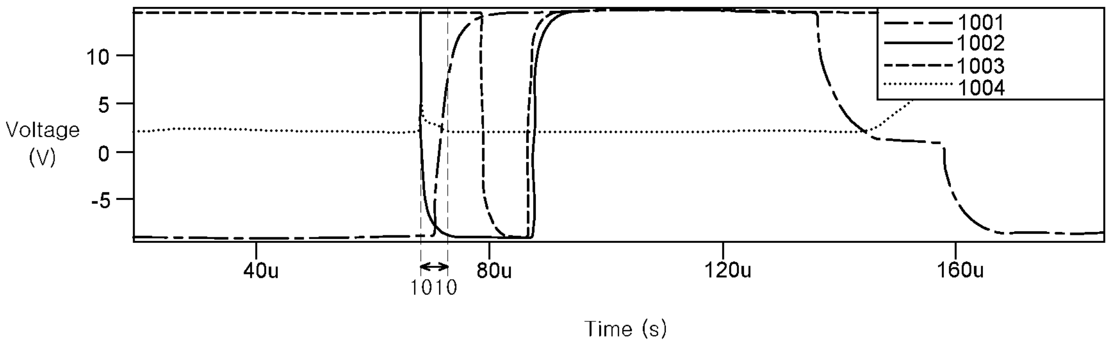
FIGS. 10A and 10B are views for explaining an example of a simulation result according to the driving of a pixel circuit of a display apparatus according to an exemplary embodiment of the present disclosure.
Figure 10B:
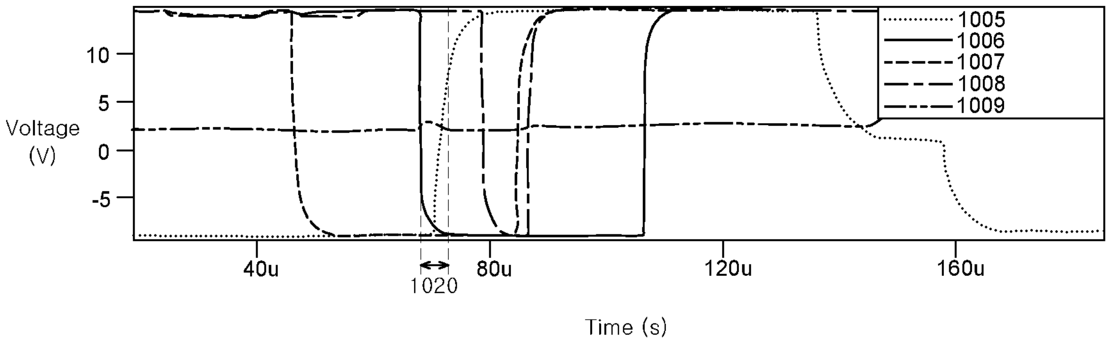

FIGS. 10A and 10B are views for explaining an example of a simulation result according to the driving of a pixel circuit of a display apparatus according to an exemplary embodiment of the present disclosure.

FIG. 10A illustrates an example of a simulation result of a pixel circuit which operates without a precharging period. Referring to FIG. 10A, an emission signal 1001 of the n-th pixel row, a second signal 1002 of an n-th pixel row, a first scan signal 1003 of an n-th pixel row may be input to the pixel circuit.

FIG. 10B illustrates an example of a simulation result of a pixel circuit which operates to include a precharging period according to the exemplary embodiment of the present disclosure. Referring to FIG. 10B, a second scan signal 1006 of the n-th pixel row, a second scan signal 1007 of the n−1-th pixel row, an emission signal 1005 of the n-th pixel row, and a first scan signal 1008 of the n-th pixel row may be input to the pixel circuit.

Referring to FIGS. 10A and 10B, the second scan signal 1007 (hereinafter, n−1-th second scan signal) of the n−1-th pixel row may be input to the pixel circuit of FIG. 10B which is operable in the precharging period. After inputting the n−1-th second scan signal 1007, the pixel circuit may operate in the initial period 1020.

Referring to FIG. 10A, in the case of the pixel circuit which does not have a precharging period, an initial peak phenomenon in which the anode voltage 1004 of the light emitting diode sharply rises to be higher than a predetermined voltage value in the initial period 1010 may occur. In contrast, referring to FIG. 10B, in the case of the pixel circuit which has the precharging period, the anode voltage 1009 of the light emitting diode may be gently changed below a predetermined voltage value. In this case, the initial peak phenomenon is improved to improve the quality of the display apparatus.

Figure 11A:
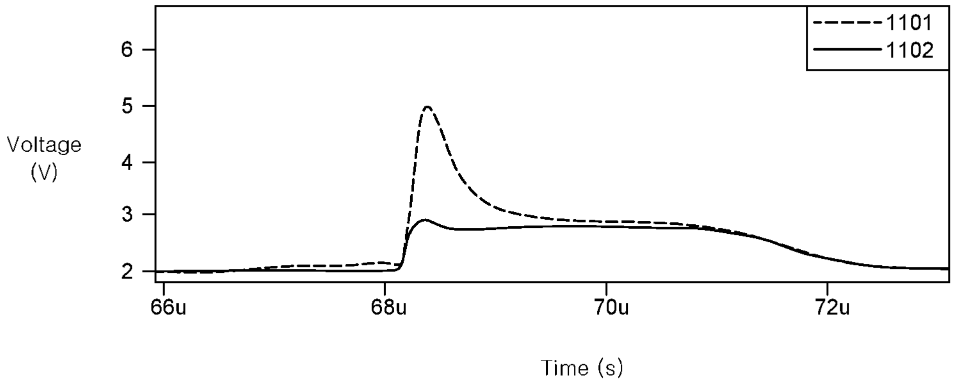
FIGS. 11A and 11B are views for explaining another example of a simulation result according to the driving of a pixel circuit of a display apparatus according to an exemplary embodiment of the present disclosure.
Figure 11B:
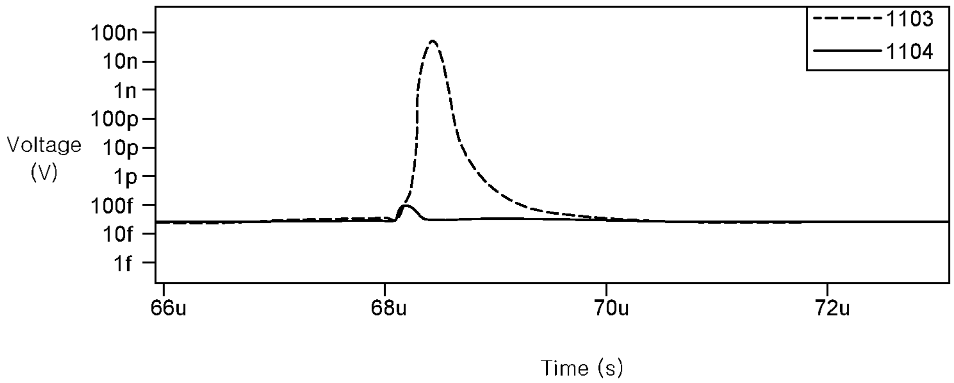

FIGS. 11A and 11B are views for explaining another example of a simulation result according to the driving of a pixel circuit of a display apparatus according to an exemplary embodiment of the present disclosure.

FIG. 11A illustrates an anode voltage 1101 of a pixel circuit in which the precharging period is omitted and an anode voltage 1102 of a pixel circuit which is operable in a precharging period, according to the exemplary embodiment of the present disclosure.

Referring to FIG. 11A, when the precharging period is omitted, the anode voltage 1101 may be sharply rising. In contrast, when the precharging period is included, the anode voltage 1102 may be gently changed without being sharply changed as compared with the anode voltage 1101.

FIG. 11B illustrates an initial peak 1103 of the pixel circuit in which the precharging period is omitted and an initial peak 1104 which is operable in the precharging period.

Referring to FIG. 11B, when the precharging period is omitted, the initial peak 1103 sharply rises so that the peak value may be shown to be higher than a predetermined value. In contrast, when the precharging period is included, the initial peak 1104 may be shown to be gently changed as compared with the initial peak 1103.

A pixel circuit according to an aspect of the present disclosure includes a first capacitor connected between a first node and a second node, a first transistor connected to the first node and supplied with a first scan signal, a driving transistor including a gate electrode connected to the second node, a first electrode connected to a first voltage supply line, and a second electrode connected to a third node, a second transistor connected between the second node and the third node and supplied with a second scan signal, a third transistor connected between the third node and a fourth node, a fourth transistor which is connected to the fourth node and is supplied with a second scan signal of a previous pixel row and a light emitting diode connected to the fourth transistor and the third transistor at the fourth node.

The light emitting diode may further connected to a second voltage supply line and a voltage supplied by the first voltage supply line may be larger than a voltage supplied by the second voltage supply line.

The first transistor may further connected to a data voltage supply line.

The third transistor may be supplied with an emission signal.

The second transistor may include a plurality of gate electrodes.

The pixel circuit may further include a fifth transistor connected to the first node and supplied with an emission signal.

The fourth transistor and the fifth transistor may further connected to a reference voltage supply line.

A period in which the pixel circuit is driven may include a precharging period, an initialization period, a sampling period, and an emission period and during the precharging period, the reference voltage may be input to the fourth node through the fourth transistor.

In the initialization period, the reference voltage may be input to the second node through the third transistor and the second transistor.

A display apparatus according to another aspect of the present disclosure includes a pixel circuit which includes a plurality of pixel rows in which a plurality of sub pixels is disposed and operates in a precharging period, an initial period, a sampling period, and an emission period, a data driving circuit connected to the pixel circuit and a gate driving circuit which supplies a first scan signal, a second scan signal, and an emission signal to each of the plurality of pixel rows, wherein in the precharging period, an n-th first scan signal and an n-th second scan signal supplied from an n-th (n is a natural number) pixel row, among the plurality of pixel rows, are first levels and an n−1-th second scan signal and an n-th emission signal are second levels which are lower than the first level.

The display apparatus may further includes a first capacitor connected between a first node and a second node, a first transistor connected to the first node and supplied with the n-th first scan signal, a driving transistor including a gate electrode connected to the second node, a first electrode connected to a first voltage supply line, and a second electrode connected to a third node, a second transistor connected between the second node and the third node and supplied with the n-th second scan signal, a third transistor connected between the third node and a fourth node, a fourth transistor which is connected to the fourth node and is supplied with the n−1-th second scan signal and a light emitting diode connected to the fourth transistor and the third transistor at the fourth node.

The light emitting diode may be further connected to a second voltage supply line and a voltage supplied by the first voltage supply line may be higher than a voltage supplied by the second voltage supply line.

The first transistor may be further connected to a data voltage supply line and the data driving circuit supplies a data voltage to the first transistor through the data voltage supply line.

The third transistor may be received the n-th emission signal.

The second transistor may include a plurality of gate electrodes.

The display apparatus may further include a fifth transistor connected to the first node and supplied with the n-th emission signal.

The fourth transistor and the fifth transistor may be further connected to a reference voltage supply line.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit, comprising:

a first capacitor having a first electrode connected to a first node and a second electrode connected to a second node;

a first transistor connected to the first node and supplied with a first scan signal;

a driving transistor including a gate electrode connected to the second node, a first electrode connected to a first voltage supply line, and a second electrode connected to a third node;

a second transistor connected between the second node and the third node and supplied with a second scan signal;

a third transistor connected between the third node and a fourth node;

a fourth transistor which is connected to the fourth node and is supplied with a second scan signal of a previous pixel row; and a light emitting diode connected to the fourth transistor and the third transistor at the fourth node.

2. The pixel circuit according to claim 1, wherein the light emitting diode is further connected to a second voltage supply line and a voltage supplied by the first voltage supply line is larger than a voltage supplied by the second voltage supply line.

3. The pixel circuit according to claim 1, wherein the first transistor is further connected to a data voltage supply line.

4. The pixel circuit according to claim 1, wherein the third transistor is supplied with an emission signal.

5. The pixel circuit according to claim 1, wherein the second transistor includes a plurality of gate electrodes.

6. The pixel circuit according to claim 1, further comprising:

a fifth transistor connected to the first node and supplied with an emission signal.

7. The pixel circuit according to claim 6, wherein the fourth transistor and the fifth transistor are further connected to a reference voltage supply line.

8. The pixel circuit according to claim 7, wherein a period in which the pixel circuit is driven includes a precharging period, an initialization period, a sampling period, and an emission period and during the precharging period, the reference voltage is input to the fourth node through the fourth transistor.

9. The pixel circuit according to claim 8, wherein in the initialization period, the reference voltage is input to the second node through the third transistor and the second transistor.

10. A display apparatus, comprising:

a pixel circuit having a plurality of pixel rows in which a plurality of sub pixels is disposed, the pixel circuit having, in operation, a precharging period, an initial period, a sampling period, and an emission period;

a data driving circuit connected to the pixel circuit; and a gate driving circuit which supplies a first scan signal, a second scan signal, and an emission signal to each of the plurality of pixel rows, wherein in the precharging period during operation, an n-th first scan signal and an n-th second scan signal supplied from an n-th (n is a natural number) pixel row, among the plurality of pixel rows, are first levels and an n−1-th second scan signal and an n-th emission signal are second levels which are lower than the first level.

11. The display apparatus according to claim 10, wherein the pixel circuit includes:

a first capacitor connected between a first node and a second node;

a first transistor connected to the first node and supplied with the n-th first scan signal;

a driving transistor including a gate electrode connected to the second node, a first electrode connected to a first voltage supply line, and a second electrode connected to a third node;

a second transistor connected between the second node and the third node and supplied with the n-th second scan signal;

a third transistor connected between the third node and a fourth node;

a fourth transistor which is connected to the fourth node and is supplied with the n−1-th second scan signal; and a light emitting diode connected to the fourth transistor and the third transistor at the fourth node.

12. The display apparatus according to claim 11, wherein the light emitting diode is further connected to a second voltage supply line and a voltage supplied by the first voltage supply line is higher than a voltage supplied by the second voltage supply line.

13. The display apparatus according to claim 11, wherein the first transistor is further connected to a data voltage supply line and the data driving circuit supplies a data voltage to the first transistor through the data voltage supply line.

14. The display apparatus according to claim 11, wherein the third transistor receives the n-th emission signal.

15. The display apparatus according to claim 11, wherein the second transistor includes a plurality of gate electrodes.

16. The display apparatus according to claim 11, further comprising:

a fifth transistor connected to the first node and supplied with the n-th emission signal.

17. The display apparatus according to claim 16, wherein the fourth transistor and the fifth transistor are further connected to a reference voltage supply line.

* * * * *